United States Patent
Wang et al.

(10) Patent No.: US 11,914,964 B2
(45) Date of Patent: Feb. 27, 2024

(54) METHOD AND APPARATUS FOR TRAINING SEMANTIC REPRESENTATION MODEL, DEVICE AND COMPUTER STORAGE MEDIUM

(71) Applicant: Beijing Baidu Netcom Science and Technology Co., Ltd., Beijing (CN)

(72) Inventors: Shuohuan Wang, Beijing (CN); Jiaxiang Liu, Beijing (CN); Xuan Ouyang, Beijing (CN); Yu Sun, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 598 days.

(21) Appl. No.: 17/209,124

(22) Filed: Mar. 22, 2021

(65) Prior Publication Data
US 2022/0004716 A1    Jan. 6, 2022

(30) Foreign Application Priority Data
Jul. 6, 2020   (CN) .......................... 202010638228.9

(51) Int. Cl.
*G06F 40/30*   (2020.01)
*G06N 20/00*   (2019.01)
*G06N 5/04*    (2023.01)

(52) U.S. Cl.
CPC .............. *G06F 40/30* (2020.01); *G06N 5/04* (2013.01); *G06N 20/00* (2019.01)

(58) Field of Classification Search
CPC ..................................................... G06F 40/30
See application file for complete search history.

(56) References Cited

U.S. PATENT DOCUMENTS

2020/0334538 A1* 10/2020 Meng .................... G10L 15/16
2020/0364542 A1* 11/2020 Sun ........................ G06N 3/084
(Continued)

FOREIGN PATENT DOCUMENTS

CN   108846126 A   11/2018
CN   110209817 A   9/2019
(Continued)

OTHER PUBLICATIONS

Tela, et al. "Transferring Monolingual Model to Low-Resource Language: The Case of Tigrinya," 2020. (Year: 2020).*
(Continued)

*Primary Examiner* — Feng-Tzer Tzeng
(74) *Attorney, Agent, or Firm* — Kwan & Olynick LLP (57) ABSTRACT

The present application discloses a method and apparatus for training a semantic representation model, a device and a computer storage medium, which relates to the field of natural language processing technologies in artificial intelligence. An implementation includes: acquiring a semantic representation model which has been trained for a first language as a first semantic representation model; taking a bottom layer and a top layer of the first semantic representation model as trained layers, initializing the trained layers, keeping model parameters of other layers unchanged, and training the trained layers using training language materials of a second language until a training ending condition is met; successively bringing the untrained layers into the trained layers from bottom to top, and executing these layers respectively: keeping the model parameters of other layers than the trained layers unchanged, and training the trained layers using the training language materials of the second language until the training ending condition is met respectively; and obtaining a semantic representation model for the second language after all the layers are trained.

20 Claims, 5 Drawing Sheets

(56) References Cited

U.S. PATENT DOCUMENTS

| | | | | |
|---|---|---|---|---|
| 2021/0142164 A1* | 5/2021 | Liu | ...................... | G06F 40/216 |
| 2021/0182498 A1* | 6/2021 | Sun | ...................... | G06F 40/40 |

FOREIGN PATENT DOCUMENTS

| | | |
|---|---|---|
| CN | 110717339 A | 1/2020 |
| CN | 111159416 A | 5/2020 |
| CN | 111160016 A | 5/2020 |
| CN | 111310474 A | 6/2020 |

OTHER PUBLICATIONS

Luo, et al., "Hierarchical Transfer Learning Architecture for Low-Resource Neural Machine Translation," IEEE Access Aug. 2019 (Year: 2019).*

Y. Chen, et al., "A teacher-student framework for zero-resource neural machine translation," in Proc. 55th Annu. Meeting Assoc. Comput. Linguistics (ACL), May 2017. (Year: 2017).*

Extended European Search Report, EP Application No. 21163589.1, dated Oct. 5, 2021, 9 pages.

Jacob Devlin, "Bert: Pre-training of Deep Bidirectional Transformers for Language Understanding", arXiv.org, Cornell University Library, Ithaca, NY, Oct. 11, 2018, 14 pages.

Baijun Ji et al., "Cross-Lingual Pre-Training Based Transfer for Zero-Shot Neural Machine Translation", The Thirty-Fourth AAAI Conference on Artificial Intelligence, (AAAI-20). Feb. 7, 2020, 8 pgs.

Mikel Artetxe et al., "On the Cross-lingual Transferability of Monolingual Representations", arXiv:1910.11856v3 [cs.CL] May 26, 2020, 15 pgs.

Morgane Riviere et al., "Unsupervised Pretraining Transfers Well Across Languages", arXiv:2002.02848v1 [eess.AS] Feb. 7, 2020, 7 pgs.

Notice of allowance for KR10-2021-0050852, dated Aug. 8, 2023, 5 pgs.

Shijie Wu et al., "Emerging Cross-lingual Structure in Pretrained Language Models", arXiv: 1911.01464v3 [cs.CL] May 7, 2020, 13 pgs.

Stephane Clinchant et al., "On the use of BERT for Neural Machine Translation", arXiv:1909.12744v1 [cs.CL] Sep. 27, 2019, 10 pgs.

Taesun Moon et al., "Towards Lingua Franca Named Entity Recognition with BERT", arXiv: 1912.01389v2 [cs. CL] Dec. 12, 2019, 8 pgs.

Toan Q. Nguyen et al., "Transfer Learning across Low-Resource, Related Languages for Neural Machine Translation", arXiv:1708.09803v2 [cs.CL] Sep. 21, 2017, 6 pgs.

Z. Chi, L. Dong, F. Wei, X.-L. Mao, and H. Huang, "Can monolingual pretrained models help cross-lingual classification?", Nov. 10, 2019, 5 pgs.

Abrhalei Tela, et al., Transferring Monolingual Model to Low-Resource Language: The Case of Tigrinya, School of Computing, arXiv:2006.07698v2 [cs.CL], Jun. 19, 2020, 5 pages.

First Office Action for JP2021-074989, Notice of Reason for Rejection, dated Jun. 7, 2022, 4 pages.

Variant of Neural Network Model, Japanese version and English Translation, Sep. 9, 2015, 20 pages.

Notice of Allowance, China Patent Application No. 202010638228.9, dated Sep. 19, 2020, 4 pages.

Office Action, China Patent Application No. 202010638228.9, dated Aug. 24, 2020, 6 pages.

Search Report, Search Report, China Patent Application No. 202010638228.9, dated Aug. 10, 2020, 4 pages.

Jacob Devlin et al., "BERT: Pre-training of Deep Bidirectional Transformers for Language Understanding", Oct. 11, 2018, 14 pages.

"ULMFiT reading notes", Microsoft Ignite China, downloaded //www.cnblogs.com/dtblog/p/10471244.html, Mar. 4, 2019.

* cited by examiner

METHOD AND APPARATUS FOR TRAINING SEMANTIC REPRESENTATION MODEL, DEVICE AND COMPUTER STORAGE MEDIUM

The present application claims the priority of Chinese Patent Application No. 202010638228.9, filed on Jul. 6, 2020, with the title of "Method and apparatus for training semantic representation model, device and computer storage medium". The disclosure of the above application is incorporated herein by reference in its entirety.

FIELD OF THE DISCLOSURE

The present application relates to the technical field of computer applications, and particularly to an artificial intelligence technology.

BACKGROUND OF THE DISCLOSURE

In recent years, pre-trained models represented by Bidirectional Encoder Representation from Transformers (BERT) models have greatly improved the effect of Natural Language Processing (NLP) tasks. However, current mainstream semantic representation models focus on common languages, such as English, Chinese, French, German, or the like. However, there are thousands of languages in the world, most of which have fewer language materials than the common languages, such as English, or the like, and these languages are called low resource languages. A lot of computing resources are required for training the pre-trained models, which results in an expensive cost. Therefore, for each language, it is difficult to construct enough language materials for training. For the language with a quite small number of language materials, such as Czech, it is even difficult to collect enough language materials for training.

SUMMARY OF THE DISCLOSURE

In view of this, the present application provides a method and apparatus for training a semantic representation model, a device and a computer storage medium, for a language with a small number of language materials.

In a first aspect, the present application provides a method for training a semantic representation model, including:
acquiring a semantic representation model which has been trained for a first language as a first semantic representation model;
taking a bottom layer and a top layer of the first semantic representation model as trained layers, initializing the trained layers, keeping model parameters of other layers unchanged, and training the trained layers using training language materials of a second language until a training ending condition is met;
successively bringing the untrained layers into the trained layers from bottom to top, and executing these layers respectively: keeping the model parameters of other layers than the trained layers unchanged, and training the trained layers using the training language materials of the second language until the training ending condition is met respectively; and
obtaining a semantic representation model for the second language after all the layers are trained.

In a second aspect, the present application further provides an electronic device, including:
at least one processor; and
a memory communicatively connected with the at least one processor;
wherein the memory stores instructions executable by the at least one processor, and the instructions are executed by the at least one processor to enable the at least one processor to perform a method for training a semantic representation model, wherein the method includes:
acquiring a semantic representation model which has been trained for a first language as a first semantic representation model; and
taking a bottom layer and a top layer of the first semantic representation model as trained layers, initializing the trained layers, keeping model parameters of other layers unchanged, and training the trained layers using training language materials of a second language until a training ending condition is met;
successively bringing the untrained layers into the trained layers from bottom to top, and executing these layers respectively: keeping the model parameters of other layers than the trained layers unchanged, and training the trained layers using the training language materials of the second language until the training ending condition is met respectively; and
obtaining a semantic representation model for the second language after all the layers are trained.

In a third aspect, the present application further provides a non-transitory computer readable storage medium with computer instructions stored thereon, wherein the computer instructions are used for causing a computer to perform a method for training a semantic representation model, wherein the method includes:
acquiring a semantic representation model which has been trained for a first language as a first semantic representation model;
taking a bottom layer and a top layer of the first semantic representation model as trained layers, initializing the trained layers, keeping model parameters of other layers unchanged, and training the trained layers using training language materials of a second language until a training ending condition is met;
successively bringing the untrained layers into the trained layers from bottom to top, and executing these layers respectively: keeping the model parameters of other layers than the trained layers unchanged, and training the trained layers using the training language materials of the second language until the training ending condition is met respectively; and
obtaining a semantic representation model for the second language after all the layers are trained.

In the present application, the trained semantic representation model for the existing language is used fully, and each layer is successively migrated and trained to obtain the semantic representation model for another language, which remarkably reduces the cost for collecting training samples for the language with a quite small number of language materials, and achieves a higher training efficiency.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the drawings, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

The present application has a core idea that a semantic representation model of a first language which is trained sufficiently is utilized to assist in training a semantic representation model of a second language. For convenience of description and understanding, examples referred in following embodiments are described with English as the first language and Chinese as the second language, but the present application is not limited thereto, and may be applied to any language.

In addition, a semantic representation model in the present application may be configured as a Recurrent Neural Network (RNN), a Convolutional Neural Network (CNN), a Transformer model, or the like. As a typical semantic representation model, the Transformer model is used as an example for describing the examples referred in following embodiments, and other models have similar implementation principles.

First Embodiment

Figure 1:
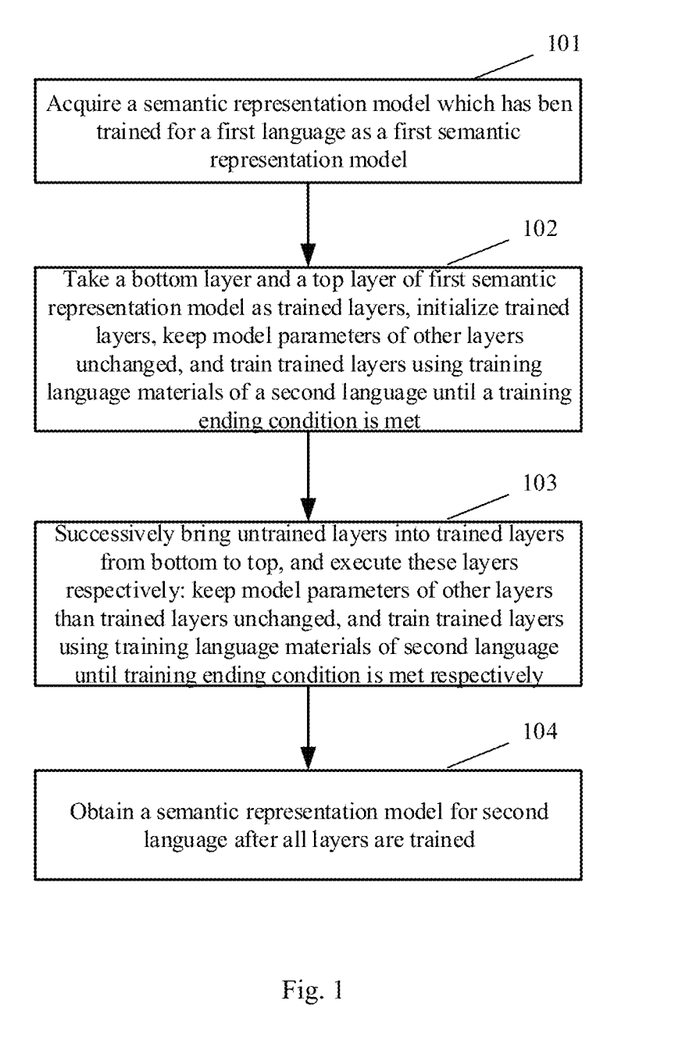
FIG. 1 is a flow chart of a method for training a semantic representation model according to a first embodiment of the present application.

FIG. 1 is a flow chart of a method for training a semantic representation model according to a first embodiment of the present application, and an apparatus for training a semantic representation model serves as a subject for executing this method, and may be configured as an application located in a computer system/server, or as a functional unit, such as a plug-in or Software Development Kit (SDK) located in the application in the computer system/server. As shown in FIG. 1, the method may include the following steps:

101: Acquiring a semantic representation model which has been trained for a first language as a first semantic representation model.

For example, English serves as the first language; since English is internationally common and usually has many language materials, a semantic representation model, such as a Transformer model, may be easily and well trained using English. In this step, a trained English Transformer model is used as the first semantic representation model for a subsequent migration training process to assist in training a Chinese Transformer model.

102: Taking a bottom layer and a top layer of the first semantic representation model as trained layers, initializing the trained layers, keeping model parameters of other layers unchanged, and training the trained layers using training language materials of a second language until a training ending condition is met.

For ease of understanding, the training language materials in the present application will be briefly described first. For the Transformer model, the language material is usually a text containing a mask and a character corresponding to the mask. Taking one training language material "我[mask]了个苹果" ("I [mask] an apple") as an example, the character corresponding to [mask] is "吃" ("ate"). Taking one training language material "我跑了很长一段[mask]才[mask]到你" ("I run a long [mask] before I [mask] you"), the characters corresponding to [mask] are "路" ("way") and "找" ("find") respectively. The Transformer model has a function of predicting the character corresponding to the mask in the training language material and making the predicted result meet expectation (the character corresponding to the mask in the training language material) as much as possible.

Figure 2:
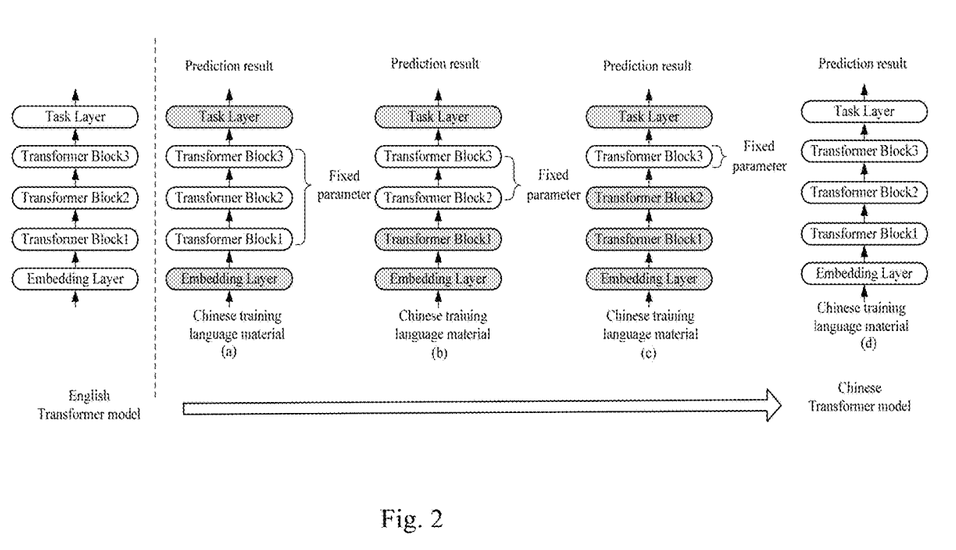
FIG. 2 is a schematic diagram of each stage of training the semantic representation model according to the first embodiment of the present application.

The Transformer model has a multilayer structure, as shown in FIG. 2. A bottom layer is an embedding layer represented by Embedding Layer, and is configured to determine vector representation of each character in the training language material. A top layer is a fully-connected layer usually represented by Task Layer, and is configured to map the vector representation processed by each middle layer of the Transformer model, so as to obtain content prediction of the mask in the training language material. A plurality of layers are contained between the top layer and the bottom layer and usually represented by Transformer Block. Each Transformer Block is used for processing the input vector representation of each character into global vector representation with an Attention mechanism. Each Transformer Block refers to the global vector representation of the previous layer when performing the Attention mechanism. The working mechanism of each Transformer Block is not detailed here. For example, three Transformer Blocks exist in FIG. 2 in the embodiment of the present application.

Usually, the bottom layer of the Transformer model pays more attention on processing literal logic, the top layer pays more attention on semantic logic, and the semantic logic of the top layer has higher consistency for different languages. Based on this assumption, in the embodiment of the present application, each layer is trained successively, the bottom layer and the top layer are trained first, and then, each middle layer is trained in combination with the bottom layer and the top layer.

In stage (a) as shown in FIG. 2, the Embedding Layer and the Task Layer in the English Transformer model are initialized as the trained layers; that is, the model parameters are initialized. The parameters of the other layers, i.e., the Transformer Blocks, are kept unchanged; that is, the parameters of each Transformer Block still keep the model parameters obtained in the previous English training process. Then, Chinese training language materials are input to train the trained Embedding Layer and Task Layer.

Each training process of the trained layer has a training target that the prediction result of the mask by the Task Layer meets expectation. That is, a loss function may be constructed according to the training target, and the model parameters of the trained layer may be optimized using values of the loss function. Each trained layer has a training ending condition that Loss converges gradually or an iteration number reaches a preset threshold.

That is, in stage (a), in the process of training the Embedding Layer and the Task Layer using the Chinese training language materials, iteration is performed by the Loss, and the parameters of the Embedding Layer and the Task Layer are optimized gradually until the Loss converges gradually or the iteration number reaches the preset threshold.

103: Successively bringing the untrained layers into the trained layers from bottom to top, and executing these layers respectively: keeping the model parameters of other layers than the trained layers unchanged, and training the trained layers using the training language materials of the second language until the training ending condition is met respectively.

In stage (b) as shown in FIG. 2, Transformer Block1 is first brought into the trained layers from bottom to top, and at this point, the trained layers include the Embedding Layer, the Task Layer and the Transformer Block1. The current parameters of the Embedding Layer and the Task Layer are parameters after the training process in 102, and the parameters of the Transformer Block1 are parameters of Transformer Block1 in the English Transformer model. The Embedding Layer, the Task Layer and the Transformer Block1 are trained with parameters of Transformer Block2 and Transformer Block3 kept unchanged. In the process of training the Embedding Layer, the Task Layer and the Transformer Block1 using the Chinese training language materials, iteration is performed by the Loss, and the parameters of the Embedding Layer, the Task Layer and the Transformer Block1 are optimized gradually until the Loss converges gradually or the iteration number reaches a preset threshold.

In stage (c) as shown in FIG. 2, the Transformer Block2 is brought into the trained layers from bottom to top, and at this point, the trained layers include the Embedding Layer, the Task Layer, the Transformer Block1 and the Transformer Block2. The Embedding Layer, the Task Layer, the Transformer Block1 and the Transformer Block2 are trained with parameters of the Transformer Block3 kept unchanged. In the process of training the Embedding Layer, the Task Layer, the Transformer Block1 and the Transformer Block2 using the Chinese training language materials, iteration is performed by the Loss, and the parameters of the Embedding Layer, the Task Layer, the Transformer Block1 and the Transformer Block2 are optimized gradually until the Loss converges gradually or the iteration number reaches a preset threshold.

In stage (d) as shown in FIG. 2, the Transformer Block3 is brought into the trained layers from bottom to top, and at this point, the trained layers include the Embedding Layer, the Task Layer, the Transformer Block1, the Transformer Block2 and the Transformer Block3. In the process of training the Embedding Layer, the Task Layer, the Transformer Block1, the Transformer Block2 and the Transformer Block3 using the Chinese training language materials, iteration is performed by the Loss, and the parameters of the Embedding Layer, the Task Layer, the Transformer Block1, the Transformer Block2 and the Transformer Block3 are optimized gradually until the Loss converges gradually or the iteration number reaches a preset threshold.

It is observed from the above-mentioned process that each English middle layer Transformer Block is actually used to perform warm start to train each Chinese Transformer Block. In addition, in addition to the above-mentioned way of training the middle layers one by one from bottom to top, if the number of the middle layers is large, the middle layers may be trained two by two from bottom to top, or more layers may be trained successively.

104: Obtaining a semantic representation model for the second language after all the layers are trained.

After completion of the training process in stage (d) as shown in FIG. 2, the Chinese Transformer model is obtained, such that a gradual migration training process is performed from the trained English Transformer model to obtain the Chinese Transformer model.

In the present embodiment, a single language material, i.e., the Chinese language material, is used to train the Chinese Transformer model by means of migration from the English Transformer model. Utilization of some bilingual parallel language materials may further reduce a training cost and improve a training effect. At this point, the training process may be performed with a method in the second embodiment.

Second Embodiment

In the present embodiment, on the basis of the first embodiment, the semantic representation model trained in the first language is further acquired as a second semantic representation model. The first semantic representation model is used as a basis for performing the layer-by-layer migration training process, and the second semantic representation model is configured to align a result of the first language output by the second semantic representation model and a result output by the first semantic representation model in the process of training the semantic representation model of the second language.

Here, an additional alignment model is required to assist the migration training process of the first semantic representation model, and configured to perform the above-mentioned alignment.

Figure 3:
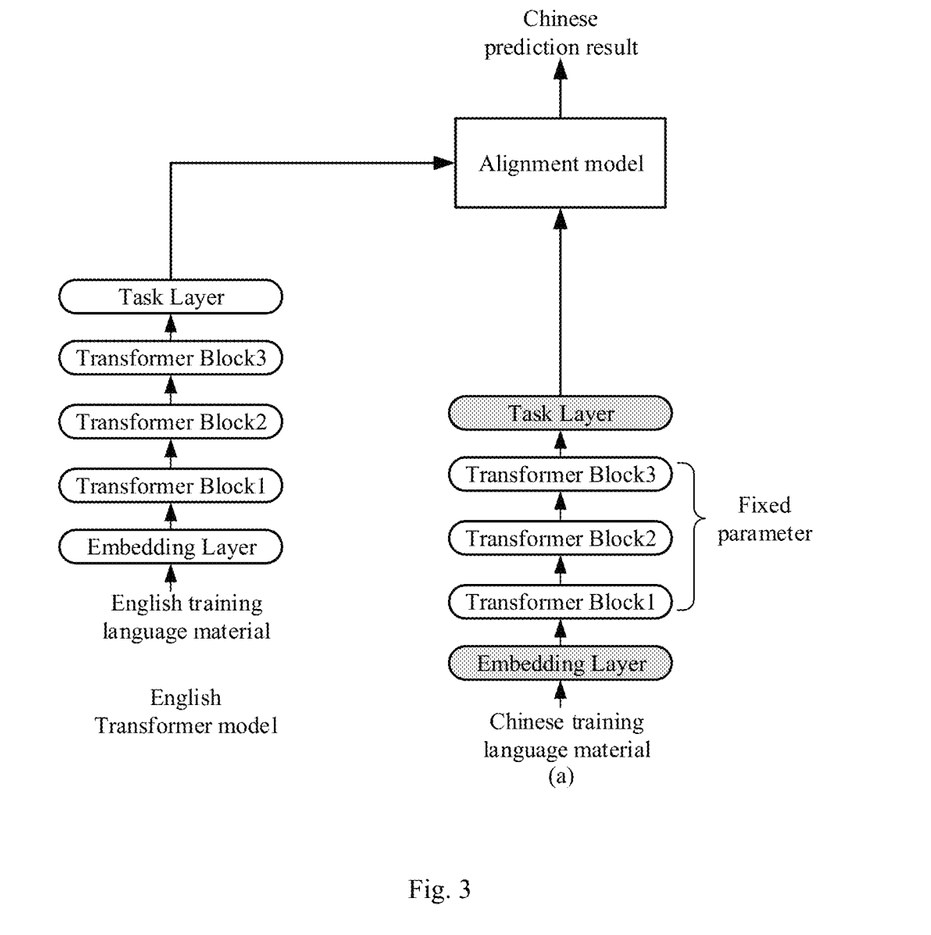
FIG. 3 is a schematic diagram of training a model using parallel language materials according to a second embodiment of the present application.

Taking the training process in stage (a) in FIG. 2 as an example, as shown in FIG. 3, the English training language material in the Chinese-English parallel language materials is input into the pre-trained English Transformer model, and an English result output by the Task Layer is input into the alignment model. Meanwhile, the Chinese training language material corresponding to the English training language material is input into the Chinese Transformer model in the training process corresponding to the stage (a), and a Chinese result output by the Task Layer is also input into the alignment model. The alignment model processes the output result of the English Transformer model with the Attention mechanism using the output result of the Chinese Transformer model being trained, and then maps an Attention processing result to obtain the prediction result of the mask in the Chinese training language material. Similarly, the training target is that the prediction result of the mask conforms to the expected character in the training language material. The Loss is constructed using the prediction result of the alignment model, the parameters of the Chinese Transformer model (i.e., the model parameters of the trained layers) being trained are optimized using the values of the Loss, and meanwhile, model parameters of the alignment model are optimized.

In the Attention processing process of the alignment model, it is assumed that the character output by the Chinese Transformer model is represented as $x_i$, and the character output by the English Transformer model is represented as y$_i$. A dot product of x$_i$ and y$_i$ is represented as A$_{ij}$, and y$_i$ is weighted with A$_{ij}$:

$$x'_i = \Sigma_{j=1}^n A_{ij} * y_j$$

wherein n is the total number of characters output by the English Transformer model.

Then, the fully-connection layer is mapped (Softmax) using a vector formed by each x'$_i$ obtained after the Attention processing process, so as to predict a mask value in the Chinese training language material.

Similar to the training process of other stages, the output result of the English Transformer model is also aligned, and details are not repeated.

For example, it is assumed that there exist such a set of parallel language materials:
English: I ate an apple.
Chinese: 我[mask]了个苹果.
The desired character of the mask is "吃" ("ate").

Figure 4:
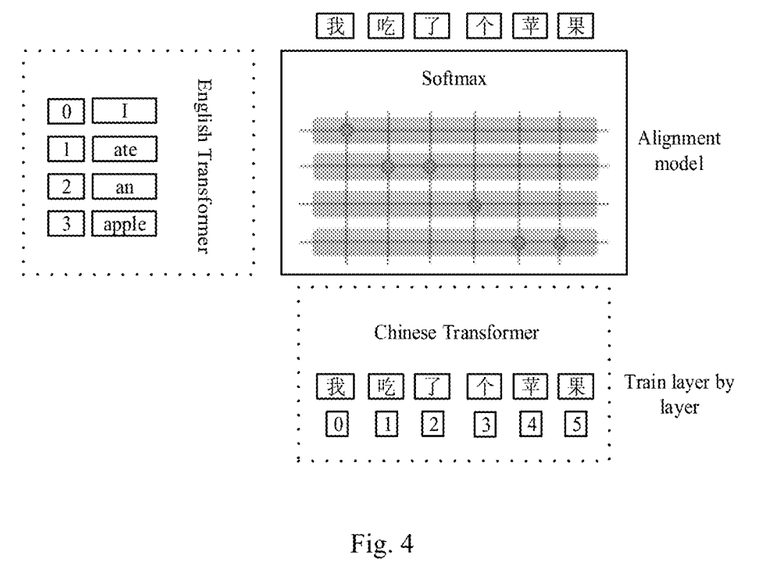
FIG. 4 is a diagram of an example of a working principle of an alignment model according to the second embodiment of the present application.

As shown in FIG. 4, the Chinese language material and a position identifier of each character (in the drawing, the position identifier of "我" is "0", the position identifier of [mask] is "1", and so on) are input into the Chinese Transformer model in the training process. The parallel English language material and a position identifier of each character (in the drawing, the position identifier of "I" is "0", the position identifier of "ate" is "1", and so on) are input into the trained English Transformer model. Each English character output by the English Transformer model and each Chinese character output by the Chinese Transformer model are output to the alignment model, and after performing Attention on the output result of the English Transformer model using the output result of the Chinese Transformer model, the alignment model performs a Softmax mapping operation on a result obtained by the Attention to obtain each Chinese character in Chinese prediction. The Loss is determined using the characters obtained in Chinese prediction and the expected characters of the Chinese language material, and the model parameters of the trained layers in the Chinese Transformer model trained layer by layer and the model parameters of the alignment model are then updated.

In addition, in the above-mentioned second embodiment, if the bilingual parallel language materials are adopted, adopted training data may not be masked. For example, it is assumed that there exist such a set of parallel language materials:
English: I ate an apple.
Chinese: 我吃了个苹果.

The Attention processing process by the alignment model is the same as the process described in the second embodiment, and after Softmax, each character in the Chinese training language material is also predicted. The Loss is determined using the characters obtained in Chinese prediction and the expected characters of the Chinese language material, and the model parameters of the trained layers in the Chinese Transformer model trained layer by layer and the model parameters of the alignment model are then updated.

In the way in the second embodiment, the bilingual parallel language materials are utilized fully, and the language material of the high-resource language is utilized fully, which further reduces the training cost, and improves the training effect of the semantic representation model of the low-resource language.

The method according to the present application is described above in detail, and an apparatus according to the present application will be described below in detail in conjunction with an embodiment.

Third Embodiment

Figure 5:
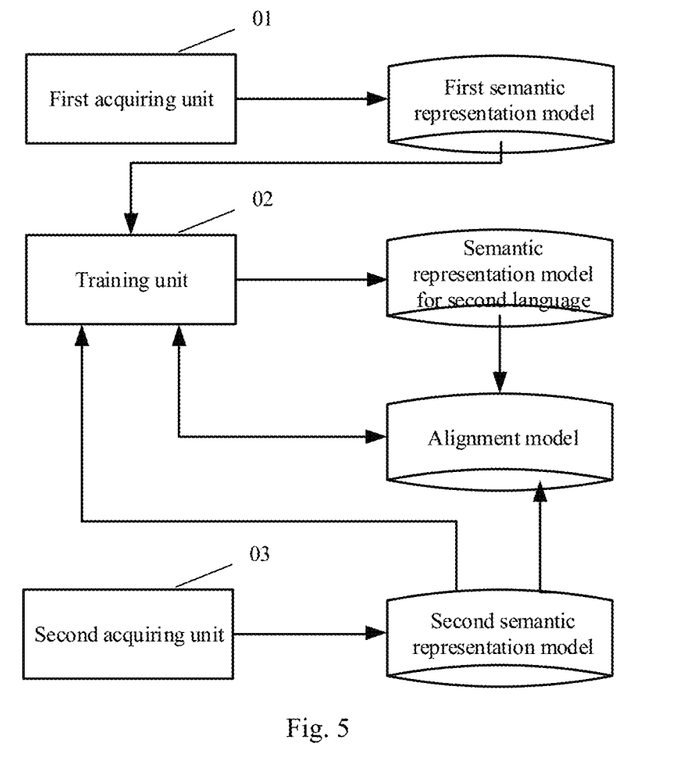
FIG. 5 is a structural diagram of an apparatus for training a semantic representation model according to a third embodiment of the present application.

FIG. 5 is a structural diagram of an apparatus for training a semantic representation model according to a third embodiment of the present application, and as shown in FIG. 5, the apparatus includes a first acquiring unit 01 and a training unit 02, and may further include a second acquiring unit 03. The main functions of each constitutional unit are as follows.

The first acquiring unit 01 is configured to acquire a semantic representation model which has been trained for a first language as a first semantic representation model.

The training unit 02 is configured to take a bottom layer and a top layer of the first semantic representation model as trained layers, initialize the trained layers, keep model parameters of other layers unchanged, and train the trained layers using training language materials of a second language until a training ending condition is met; successively bring the untrained layers into the trained layers from bottom to top, and execute these layers respectively: keep the model parameters of other layers than the trained layers unchanged, and train the trained layers using the training language materials of the second language until the training ending condition is met respectively; and obtain a semantic representation model for the second language after all the layers are trained.

The bottom layer is configured as an embedding layer, and the top layer is configured as a fully-connected layer. The semantic representation model may be configured as a CNN, an RNN, a Transformer model, or the like.

The training language material of the second language includes a text with a mask in the second language and a character corresponding to the mask.

When training each layer of the first semantic representation model, the training unit 02 has a training target that the prediction result of the mask by the top layer accords with the character corresponding to the mask in the training language material.

Each training process of the trained layer has a training target that the prediction result of the mask by the top layer meets expectation. That is, a loss function may be constructed according to the training target, and the model parameters of the trained layer may be optimized using values of the loss function. Each trained layer has a training ending condition that Loss converges gradually or an iteration number reaches a preset threshold.

Utilization of some bilingual parallel language materials may further reduce a training cost and improve a training effect. At this point, the second acquiring unit 03 is configured to acquire the semantic representation model trained for the first language as a second semantic representation model.

When training the trained layers using the training language material of the second language, the training unit 02 inputs the parallel language material of the first language corresponding to the training language material of the second language into the second semantic representation model; and aligns an output result of the second semantic representation model with an output result of the first semantic representation model.

Specifically, the training unit 02 may align the output result of the second semantic representation model with the output result of the first semantic representation model specifically by:

inputting the output result of the first semantic representation model and the output result of the second semantic representation model into an alignment model; and processing, by the alignment model, the output result of the second semantic representation model with an attention mechanism using the output result of the first semantic representation model, and mapping a processing result of the attention mechanism to obtain a prediction result of the character in the training language material of the second language.

If the training language material of the second language in the parallel language materials includes a text with a mask in the second language and a character corresponding to the mask, the training target is that the language material result of the mask in the training language material of the second language accords with the character corresponding to the mask in the training language material.

If the training language material of the second language in the parallel language materials is a text without a mask in the second language, the training target is that the prediction result of each character in the training language material of the second language accords with each character in the training language material.

According to the embodiment of the present application, there are also provided an electronic device and a readable storage medium.

Figure 6:
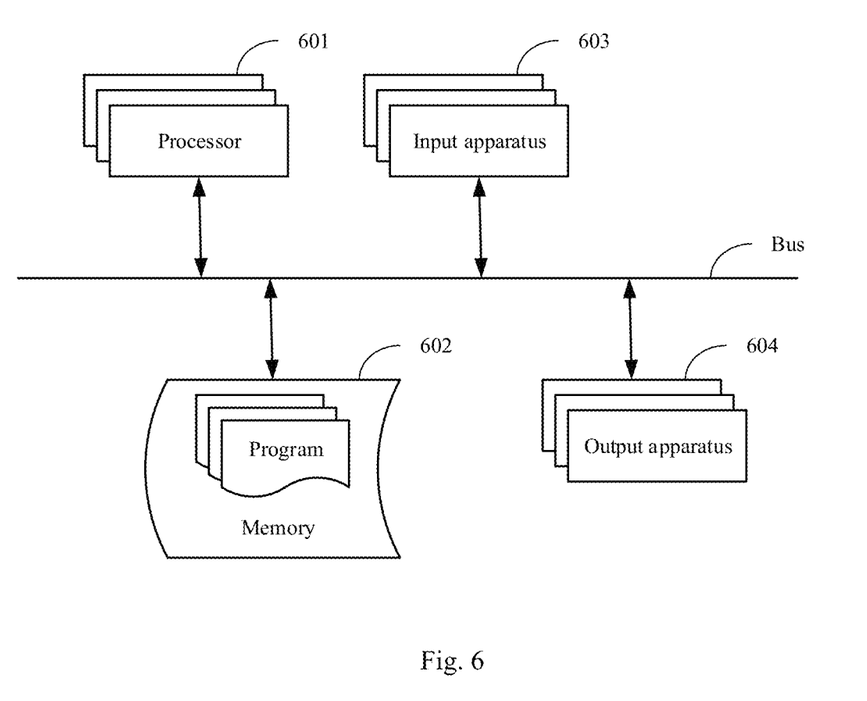
FIG. 6 is a block diagram of an electronic device configured to implement the embodiment of the present application.

FIG. 6 is a block diagram of an electronic device for a method for training a semantic representation model according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 6, the electronic device includes one or more processors 601, a memory 602, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 6, one processor 601 is taken as an example.

The memory 602 is configured as the non-transitory computer readable storage medium according to the present application. The memory stores instructions executable by the at least one processor to cause the at least one processor to perform a method for training a semantic representation model according to the present application. The non-transitory computer readable storage medium according to the present application stores computer instructions for causing a computer to perform the method for training a semantic representation model according to the present application.

The memory 602 which is a non-transitory computer readable storage medium may be configured to store non-transitory software programs, non-transitory computer executable programs and modules, such as program instructions/modules corresponding to the method for training a semantic representation model according to the embodiment of the present application. The processor 601 executes various functional applications and data processing of a server, that is, implements the method for training a semantic representation model according to the above-mentioned embodiments, by running the non-transitory software programs, instructions, and modules stored in the memory 602.

The memory 602 may include a program storage area and a data storage area, wherein the program storage area may store an operating system and an application program required for at least one function; the data storage area may store data created according to use of the electronic device, or the like. Furthermore, the memory 602 may include a high-speed random access memory, or a non-transitory memory, such as at least one magnetic disk storage device, a flash memory device, or other non-transitory solid state storage devices. In some embodiments, optionally, the memory 602 may include memories remote from the processor 601, and such remote memories may be connected to the electronic device via a network. Examples of such a network include, but are not limited to, the Internet, intranets, local area networks, mobile communication networks, and combinations thereof.

The electronic device may further include an input apparatus 603 and an output apparatus 604. The processor 601, the memory 602, the input apparatus 603 and the output apparatus 604 may be connected by a bus or other means, and FIG. 6 takes the connection by a bus as an example.

The input apparatus 603 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 604 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, application specific integrated circuits (ASIC), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLD)) for providing machine instructions and/or data for a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present application may be achieved.

The above-mentioned implementations are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for training a semantic representation model, comprising:
   acquiring a semantic representation model which has been trained for a first language as a first semantic representation model;
   taking a bottom layer and a top layer of the first semantic representation model as trained layers, initializing the trained layers, keeping model parameters of other layers unchanged, and training the trained layers using training language materials of a second language until a training ending condition is met;
   successively bringing the untrained layers into the trained layers from bottom to top, and executing these layers respectively: keeping the model parameters of other layers than the trained layers unchanged, and training the trained layers using the training language materials of the second language until the training ending condition is met respectively; and
   obtaining a semantic representation model for the second language after all the layers are trained.

2. The method according to claim 1, wherein the semantic representation model comprises a Transformer model.

3. The method according to claim 1, wherein the training language material of the second language comprises a text with a mask in the second language and a character corresponding to the mask; and
   the training process of each layer of the first semantic representation model has a training target that the prediction result of the mask by the top layer accords with the character corresponding to the mask in the training language material.

4. The method according to claim 2, wherein the training language material of the second language comprises a text with a mask in the second language and a character corresponding to the mask; and
   the training process of each layer of the first semantic representation model has a training target that the prediction result of the mask by the top layer accords with the character corresponding to the mask in the training language material.

5. The method according to claim 1, further comprising:
   acquiring the semantic representation model trained for the first language as a second semantic representation model; and
   when the trained layers are trained using the training language material of the second language, inputting the parallel language material of the first language corresponding to the training language material of the second language into the second semantic representation model; and aligning an output result of the second semantic representation model with an output result of the first semantic representation model.

6. The method according to claim 5, wherein
   the aligning an output result of the second semantic representation model with an output result of the first semantic representation model comprises:
   inputting the output result of the first semantic representation model and the output result of the second semantic representation model into an alignment model; and
   processing, by the alignment model, the output result of the second semantic representation model with an attention mechanism using the output result of the first semantic representation model, and mapping a processing result of the attention mechanism to obtain a prediction result of the character in the training language material of the second language.

7. The method according to claim 2, further comprising:
   acquiring the semantic representation model trained for the first language as a second semantic representation model; and
   when the trained layers are trained using the training language material of the second language, inputting the parallel language material of the first language corresponding to the training language material of the second language into the second semantic representation model; and aligning an output result of the second semantic representation model with an output result of the first semantic representation model.

8. The method according to claim 7, wherein
the aligning an output result of the second semantic representation model with an output result of the first semantic representation model comprises:
inputting the output result of the first semantic representation model and the output result of the second semantic representation model into an alignment model; and
processing, by the alignment model, the output result of the second semantic representation model with an attention mechanism using the output result of the first semantic representation model, and mapping a processing result of the attention mechanism to obtain a prediction result of the character in the training language material of the second language.

9. The method according to claim 6, wherein if the training language material of the second language comprises a text with a mask in the second language and a character corresponding to the mask, the training target is that the prediction result of the mask in the training language material of the second language accords with the character corresponding to the mask in the training language material; and
if the training language material of the second language is a text without a mask in the second language, the training target is that the prediction result of each character in the training language material of the second language accords with each character in the training language material.

10. The method according to claim 8, wherein if the training language material of the second language comprises a text with a mask in the second language and a character corresponding to the mask, the training target is that the prediction result of the mask in the training language material of the second language accords with the character corresponding to the mask in the training language material; and
if the training language material of the second language is a text without a mask in the second language, the training target is that the prediction result of each character in the training language material of the second language accords with each character in the training language material.

11. An electronic device, comprising:
at least one processor; and
a memory communicatively connected with the at least one processor;
wherein the memory stores instructions executable by the at least one processor, and the instructions are executed by the at least one processor to enable the at least one processor to perform a method for training a semantic representation model, wherein the method comprises:
acquiring a semantic representation model which has been trained for a first language as a first semantic representation model; and
taking a bottom layer and a top layer of the first semantic representation model as trained layers, initializing the trained layers, keeping model parameters of other layers unchanged, and training the trained layers using training language materials of a second language until a training ending condition is met;

successively bringing the untrained layers into the trained layers from bottom to top, and executing these layers respectively: keeping the model parameters of other layers than the trained layers unchanged, and training the trained layers using the training language materials of the second language until the training ending condition is met respectively; and
obtaining a semantic representation model for the second language after all the layers are trained.

12. The electronic device according to claim 11, wherein the semantic representation model comprises a Transformer model.

13. The electronic device according to claim 11, wherein the training language material of the second language comprises a text with a mask in the second language and a character corresponding to the mask; and
the training process of each layer of the first semantic representation model has a training target that the prediction result of the mask by the top layer accords with the character corresponding to the mask in the training language material.

14. The electronic device according to claim 12, wherein the training language material of the second language comprises a text with a mask in the second language and a character corresponding to the mask; and
the training process of each layer of the first semantic representation model has a training target that the prediction result of the mask by the top layer accords with the character corresponding to the mask in the training language material.

15. The electronic device according to claim 11, further comprising:
acquiring the semantic representation model trained for the first language as a second semantic representation model;
when the trained layers are trained using the training language material of the second language, inputting the parallel language material of the first language corresponding to the training language material of the second language into the second semantic representation model; and aligning an output result of the second semantic representation model with an output result of the first semantic representation model.

16. The electronic device according to claim 12, further comprising:
acquiring the semantic representation model trained for the first language as a second semantic representation model;
when the trained layers are trained using the training language material of the second language, inputting the parallel language material of the first language corresponding to the training language material of the second language into the second semantic representation model; and aligning an output result of the second semantic representation model with an output result of the first semantic representation model.

17. The electronic device according to claim 15, wherein the aligning an output result of the second semantic representation model with an output result of the first semantic representation model comprises:
inputting the output result of the first semantic representation model and the output result of the second semantic representation model into an alignment model; and
processing, by the alignment model, the output result of the second semantic representation model with an attention mechanism using the output result of the first semantic representation model, and mapping a processing result of the attention mechanism to obtain a prediction result of the character in the training language material of the second language.

18. The electronic device according to claim 15, wherein if the training language material of the second language comprises a text with a mask in the second language and a character corresponding to the mask, the training target is that the prediction result of the mask in the training language material of the second language accords with the character corresponding to the mask in the training language material; and if the training language material of the second language is a text without a mask in the second language, the training target is that the prediction result of each character in the training language material of the second language accords with each character in the training language material.

19. The electronic device according to claim 16, wherein the aligning an output result of the second semantic representation model with an output result of the first semantic representation model comprise:

inputting the output result of the first semantic representation model and the output result of the second semantic representation model into an alignment model; and processing, by the alignment model, the output result of the second semantic representation model with an attention mechanism using the output result of the first semantic representation model, and mapping a processing result of the attention mechanism to obtain a prediction result of the character in the training language material of the second language.

20. A non-transitory computer readable storage medium with computer instructions stored thereon, wherein the computer instructions are used for causing a computer to perform a method for training a semantic representation model, wherein the method comprises:

acquiring a semantic representation model which has been trained for a first language as a first semantic representation model;

taking a bottom layer and a top layer of the first semantic representation model as trained layers, initializing the trained layers, keeping model parameters of other layers unchanged, and training the trained layers using training language materials of a second language until a training ending condition is met;

successively bringing the untrained layers into the trained layers from bottom to top, and executing these layers respectively: keeping the model parameters of other layers than the trained layers unchanged, and training the trained layers using the training language materials of the second language until the training ending condition is met respectively; and obtaining a semantic representation model for the second language after all the layers are trained.

* * * * *